US007614056B1

(12) United States Patent
Saxe et al.

(10) Patent No.: US 7,614,056 B1
(45) Date of Patent: Nov. 3, 2009

(54) PROCESSOR SPECIFIC DISPATCHING IN A HETEROGENEOUS CONFIGURATION

(75) Inventors: Eric C. Saxe, Fremont, CA (US); Andrei Dorofeev, San Jose, CA (US); Jonathan Chew, San Francisco, CA (US); Bart Smaalders, Menlo Park, CA (US); Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1363 days.

(21) Appl. No.: 10/661,413

(22) Filed: Sep. 12, 2003

(51) Int. Cl.
G06F 9/46 (2006.01)
G06F 9/455 (2006.01)
G06F 15/76 (2006.01)

(52) U.S. Cl. .......................... 718/105; 718/1; 718/100; 718/102; 712/34

(58) Field of Classification Search ................. 718/100, 718/102, 104, 105, 1; 709/220; 712/32–34; 703/22; 702/182, 186; 713/320
See application file for complete search history.

(56) References Cited

U.S. PATENT DOCUMENTS

| 5,937,187 | A | 8/1999 | Kosche et al. |
| 5,960,461 | A | 9/1999 | Frank et al. |
| 6,002,870 | A | 12/1999 | Faulkner et al. |
| 6,092,175 | A | 7/2000 | Levy et al. |
| 6,105,053 | A * | 8/2000 | Kimmel et al. ............. 718/105 |
| 6,272,520 | B1 | 8/2001 | Sharangpani et al. |
| 6,298,411 | B1 | 10/2001 | Giacalone |
| 6,314,511 | B2 | 11/2001 | Levy et al. |
| 6,330,649 | B1 | 12/2001 | Frank et al. |
| 6,341,347 | B1 | 1/2002 | Joy et al. |
| 6,351,808 | B1 | 2/2002 | Joy et al. |
| 6,493,741 | B1 | 12/2002 | Emer et al. |
| 6,507,862 | B1 | 1/2003 | Joy et al. |
| 6,542,991 | B1 | 4/2003 | Joy et al. |
| 6,598,122 | B2 | 7/2003 | Mukherjee et al. |
| 6,622,217 | B2 | 9/2003 | Gharachorloo et al. |
| 6,651,158 | B2 | 11/2003 | Burns et al. |
| 6,658,447 | B2 | 12/2003 | Cota-Robles |
| 7,051,329 | B1 * | 5/2006 | Boggs et al. ................. 718/104 |
| 7,080,379 | B2 * | 7/2006 | Brenner et al. .............. 718/105 |

(Continued)

FOREIGN PATENT DOCUMENTS

JP 2004171167 A * 6/2004

OTHER PUBLICATIONS

Intel Corporation, "Hyper-Threading Technology on the Intel Xeon Processor Family for Servers," 2002, pp. 1-12.

(Continued)

*Primary Examiner*—Van H Nguyen
*Assistant Examiner*—Kenneth Tang
(74) *Attorney, Agent, or Firm*—Osha • Liang LLP

(57) ABSTRACT

An abstraction layer is comprised in the operating system that represents the particulars of the PPMs. The abstractions in the abstraction layer are differentiated from one another by parameters representing the characteristics of the PPMs. The dispatcher uses the abstraction to balance processing loads when assigning execution threads to the PPMs. The assigning of the execution threads and the balancing of the processing loads is performed while taking account of the characteristics of the PPMs, such as shared resources and clock speed.

60 Claims, 12 Drawing Sheets

U.S. PATENT DOCUMENTS

| | | | |
|---|---|---|---|
| 2002/0078122 | A1 | 6/2002 | Joy et al. |
| 2002/0138717 | A1 | 9/2002 | Joy et al. |
| 2003/0014612 | A1 | 1/2003 | Joy et al. |
| 2003/0023794 | A1 | 1/2003 | Venkitakrishnan et al. |
| 2003/0046495 | A1 | 3/2003 | Venkitakrishnan et al. |
| 2003/0084269 | A1* | 5/2003 | Drysdale et al. ............. 712/36 |
| 2003/0126365 | A1 | 7/2003 | Jamil et al. |
| 2003/0191927 | A1 | 10/2003 | Joy et al. |
| 2004/0024874 | A1* | 2/2004 | Smith ........................ 709/225 |
| 2004/0199919 | A1* | 10/2004 | Tovinkere .................. 718/102 |
| 2004/0215987 | A1* | 10/2004 | Farkas et al. ............... 713/300 |
| 2004/0268347 | A1* | 12/2004 | Knauerhase et al. ........... 718/1 |
| 2005/0033831 | A1* | 2/2005 | Rashid ....................... 709/220 |

OTHER PUBLICATIONS

Joel M. Tendler et al., "IBM Server POWER4 System Microarchitecture," Technical White Paper, Oct. 2001, pp. 1-33.

Sandeep Khanna, et al., "Realtime Scheduling in SunOS 5.0," undated, 16 pages.

J. R. Eykholt, et al., "Beyond Multiprocessing . . . Multithreading the SunOS Kernel," Summer '92 USENIX—Jun. 8-Jun. 12, 1992, San Antonio, TX, pp. 1-10.

R. C. Agarwal, et al., "Fast Pseudorandom-Number Generators with Modulus $2^k$ or $2^k-1$ Using Fused Multiply-Add," IBM J. Res. & Dev., vol. 46, No. 1, Jan. 2002, pp. 97-116.

G. P. Rodgers, et al., "Infrastructure Requirements for a Large-Scale, Multi-Site VLSI Development Project," IBM J. Res. & Dev., vol. 46, No. 1, Jan. 2002, pp. 87-95.

D. C. Bossen, et al., "Fault-Tolerant Design of the IBM pSeries 690 System Using POWER4 Processor Technology," IBM J. Res. & Dev., vol. 46, No. 1, Jan. 2002, pp. 77-86.

J. M. Ludden, et al., "Functional Verification of the POWER4 Microprocessor and POWER4 Multiprocessor Systems," IBM J. Res. & Dev., vol. 46, No. 1, Jan. 2002, pp. 53-76.

J. D. Warnock, et al., "The Circuit and Physical Design of the POWER4 Microprocessor," IBM J. Res. & Dev., vol. 46, No. 1, Jan. 2002, pp. 27-51.

J. M. Tendler, et al., "POWER4 System Microarchitecture," IBM J. Res. & Dev., vol. 46, No. 1, Jan. 2002, pp. 5-25.

Vijay T. Lund, "Preface," IBM J. Res. & Dev., vol. 46, No. 1, Jan. 2002, pp. 3-4.

* cited by examiner

PROCESSOR SPECIFIC DISPATCHING IN A HETEROGENEOUS CONFIGURATION

BACKGROUND

The effective throughput of a computer can be increased by using multiple Physical Processing Modules (PPMs) (a physical processing module is a chip or a die having one or more physical processing cores). In the past, multiple PPM systems were typically homogeneous in that they had one type of PPM, and each PPM had one physical processing core.

In the prior art, PPMs are seen by the software as one or more generic logical processing entities (e.g., schedulable entities) upon which a single execution thread may be scheduled to run. Historically, there has been a one-to-one mapping between PPMs and generic logical processing entities, and the PPMs existing in a given system have typically been homogeneous. Any resources (e.g., physical memory and data pathways) shared by PPMs and/or generic logical processing entities have been historically "off-chip," meaning that the shared resources have not been located on the PPMs, but have been located elsewhere. In this specification the word "resource" and its conjugations refer to any resource or facility (whether or not it is associated with an amount or a supply that can be expended or filled), and the word facility and its conjugations may be interchanged with the word resource and its corresponding conjugations wherever they appear. Software (e.g., operating systems) that have been designed to work with traditional PPMs (and configurations thereof) may assume that (1) no special relationship exists (such as resource sharing) between PPMs (and therefore no special relationship exists between the corresponding generic logical processing entities) in a system, and (2) PPMs in a system have the same operational characteristics.

SUMMARY

The present invention provides several features that can each be used independently of one another or with any combination of the other features. Although many of the features of the present invention are motivated by the problems explained above, any individual feature may not address any of the problems discussed above or may only address one of the problems discussed above. Some of the problems discussed above may not be fully addressed by any of the features of the present invention.

An abstraction of a PPM is provided that characterizes the particulars of the PPM. In different embodiments, the abstractions may model the particulars of the PPMs to varying degrees. Each abstraction models at least some characteristics specific to a PPM. The abstractions may comprise parameterization information regarding the characteristics of the PPMs. To the extent that each PPM differs from one another and to the degree to which the particulars of the PPMs are comprised in the abstractions, the abstractions of the PPMs may be differentiated from one another by the differing characteristics of the PPM being modeled. In an embodiment, the abstractions comprise indications of how many logical processing entities are provided by the PPM. In an embodiment, the abstraction may additionally or instead comprise operational information indicating one or more operational characteristics of the PPM. Using the abstractions, the operating system is able to account for the differences in the PPMs and how the hardware threads and physical processing cores share resources. This in turn enables the operating system to treat different logical processing entities differently when dispatching threads to achieve a greater overall efficiency. The abstractions may have a variety of different types of clients, such as application programs or a dispatcher or other part of an operating system.

BRIEF DESCRIPTION OF THE DRAWINGS

The embodiments of the present invention are illustrated by way of example, and not limited by or to these examples, in the figures of the accompanying drawings, and in which like reference numerals refer to similar elements and in which.

DETAILED DESCRIPTION OF EMBODIMENT(S)

In general in this specification, for each of FIGS. 1-5, first a brief description of each numbered feature of the figure is given. In the brief description of each numbered feature, essentially just the name of each numbered feature is given. Next, after the brief description of each numbered feature, follows a more detailed description of the each numbered feature and a description of how each of the features cooperate together. Each of the figures and features are generally discussed in the order in which they are numbered. Although headings are provided, information related to a particular heading, but not found in the section having that heading, may also be found elsewhere in the specification.

Functional Overview of Various Embodiments

In an embodiment, an abstraction layer is added to the operating system. The abstraction layer may include abstractions of PPMs. The abstractions are used by the operating system, while dispatching execution threads, to account for differences between the various PPMs in order to optimally balance the workload across the PPMs. In an embodiment, the operating system includes an abstraction manager for creating and/or managing the abstractions. In an embodiment, the operating system comprises a dispatcher, which access the abstractions to obtain information about the PPMs (e.g., information about operational characteristics and resource sharing) in order to decide which execution threads will be dispatched to which PPMs. In an embodiment, the abstractions are also utilized by the application layer to take into account the characteristics of and/or differences among the various PPMs to optimize its performance.

Overview of Dispatching Execution Threads in a Homogeneous System

In this specification, although several features are given a range "a-n," the number "n" in each range (no matter where in this specification the range appears) may be any number. Thus, each range "a-n" may contain any number of elements, and each range "a-n" in this specification may be different or the same in number in comparison to any other range "a-n," except for when a relation between two ranges "a-n" is specified.

Figure 1A:
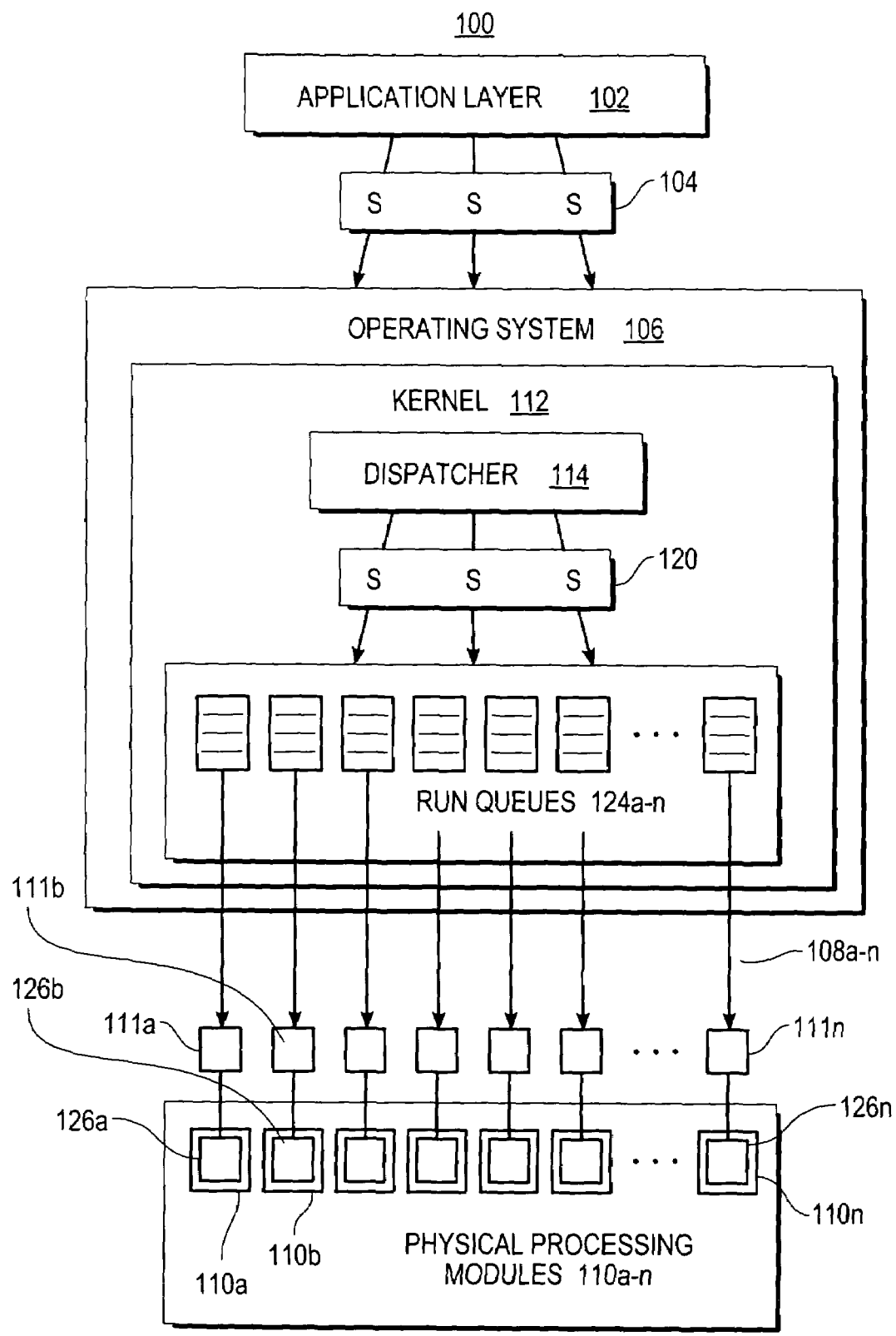
FIG. 1A shows a block diagram of a homogeneous system having an operating system dispatching threads to multiple PPMs.

FIG. 1A shows a block diagram of a system 100 having an operating system dispatching threads to multiple physical processing cores or hardware threads. System 100 comprises application layer 102, application threads 104, operating system 106, execution threads 108a-n, and PPMs 110a-n. Each of PPMs 110a-n is represented to operating system 106 as one of generic logical processing entities 111a-n. Operating system 106 comprises kernel 112, which in turn comprises dispatcher 114, execution threads 120, and run queues 124a-n. PPMs 110a-n comprise physical processing cores 126a-n.

Application layer 102 comprises one or more applications that create application threads 104 as part of their normal operations, which are scheduled by operating system 106 as execution threads 108a-n. The scheduling is performed by dispatcher 114 after receiving input regarding application threads 104 needing to be dispatched. Application threads 104 are execution threads generated by application 102. Each of application threads 104 corresponds to a task, routine, and/or object associated with application 102.

Dispatcher 114 dispatches application threads 104 as execution threads 120. Execution threads 120 may also comprise execution threads generated by operating system 106. Each of generic logical processing entities 111a-n are the same, and represent one of the physical processing cores 126a-n associated with PPMs 110a-n. Each of generic logical processing entities 111a-n may also be referred to as a schedulable entity, because each of generic logical processing entities 111a-n is presented to operating system 106 as essentially a generic entity upon which threads can be scheduled for processing. PPMs 110a-n and generic logical processing entities 111a-n have a one-to-one correspondence. In other words, each of generic logical processing entities 111a-n corresponds to one of PPMs, each of which contains just one physical processing core, which is one of physical processing cores 126a-n. During the operation of operating system 106, generic logical processing entities 111a-n are used by dispatcher 114 to schedule execution threads 120 on run queues 124a-n, partially balancing the loads associated with execution threads 120 among PPMs 110a-n. As each of PPMs 110a-n is ready to accept another thread, it grabs the next of execution threads 108a-n from the one of run queues 124a-n with which it is associated. Since each of PPMs 10a-n is essentially identical to the others of PPMs 110a-n, operating system 106 can treat each of generic logical processing entities 111a-n as being the same (e.g., having the same operational parameters such as clock speed and having the same available cache and TLB).

Overview of Some Newer PPM Types

Figure 1B:
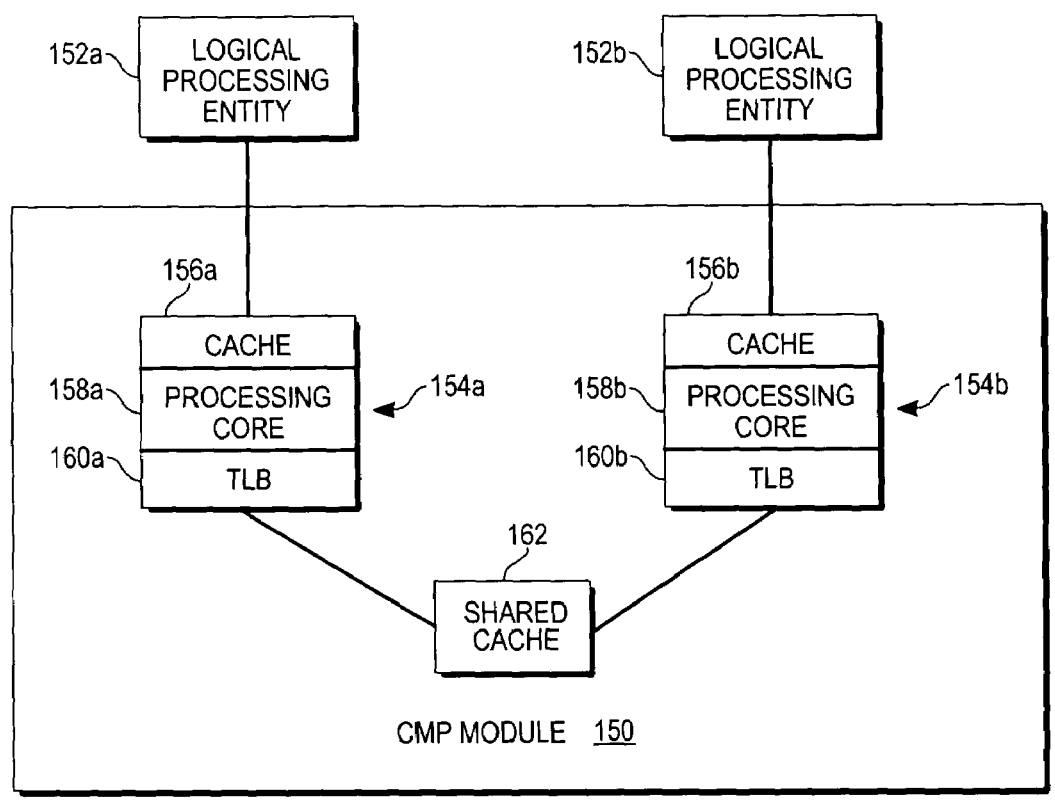
FIG. 1B shows a block diagram of a CMP module and associated logical processing entities.
Figure 1C:
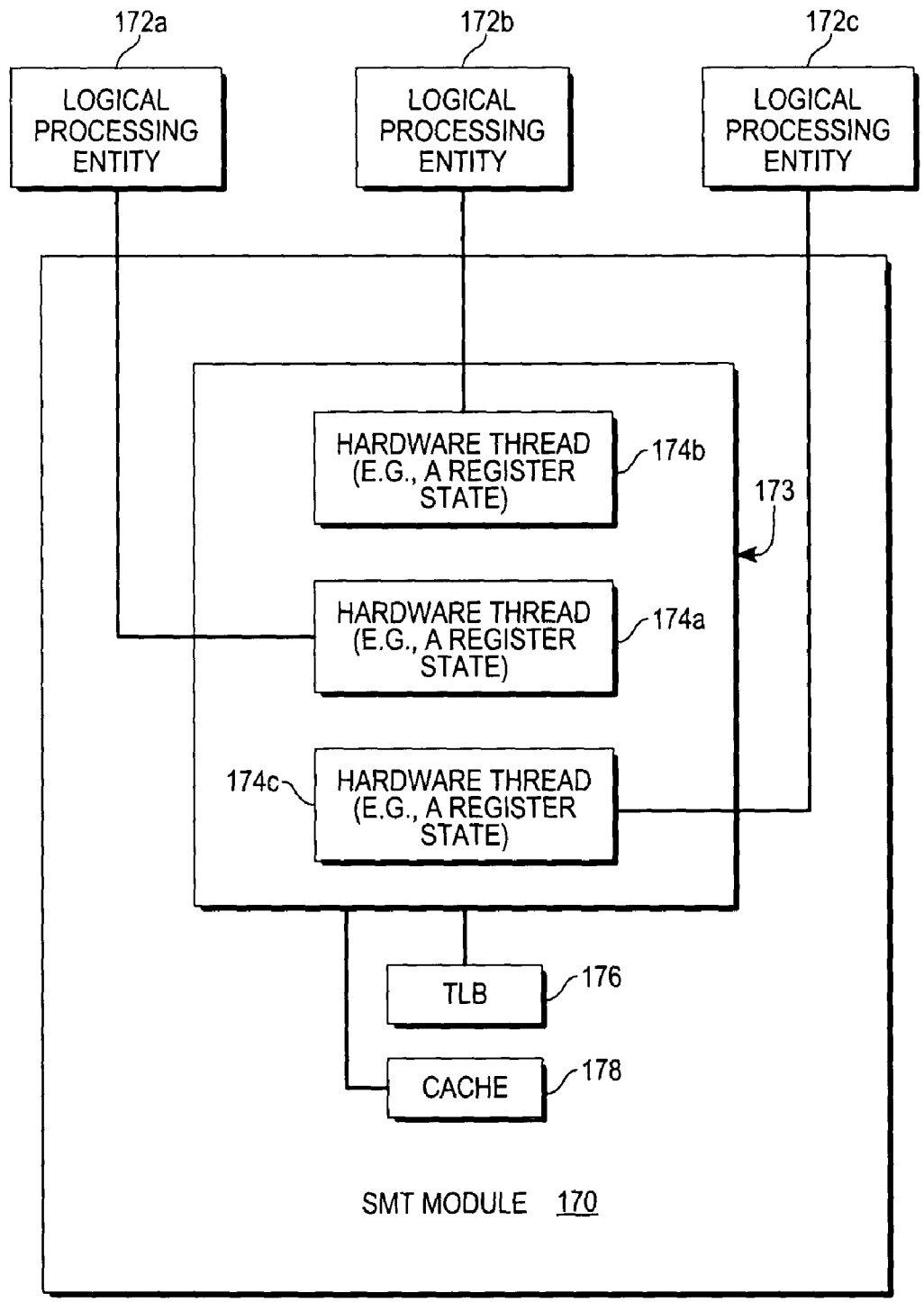
FIG. 1C shows a block diagram of an SMT module and associated logical processing entities.
Figure 1D:
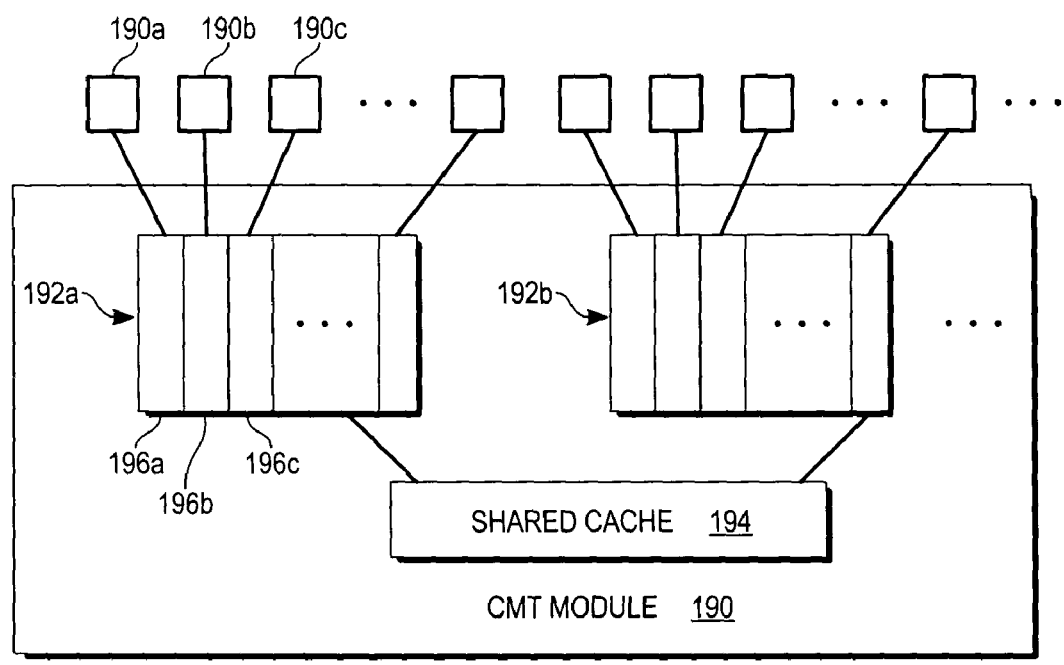
FIG. 1D shows a block diagram of a CMT module and associated logical processing entities.

Several types of PPMs exist, some examples of which are, Chip Multi-Processing modules (CMP modules), Simultaneous Multi-Threading modules (SMT modules), and Threaded CMP modules (CMT modules) shown in FIGS. 1B-D, respectively. These different types of PPMs can be implemented within the same system, which therefore is not homogeneous. Newer types of PPMs (e.g., CMP, SMT, and CMT) are different in that multiple generic processing entities may be presented by a single PPM, or single processing core. Therefore, multiple logical processing entities may "share" the use of certain resources. Additionally, different types of PPMs may co-exist in a single system, each having different operational characteristics.

FIG. 1B shows a block diagram of a CMP module 150 and associated logical processing entities 152a and 152b. CMP module 150 has physical processing entities 154a and 154b, which have caches 156a and 156b, physical processing cores 158a and 158b, and Translation Lookaside Buffers (TLBS) 160a and 160b, respectively. As an aside, in this specification a "physical processing entity" is used to refer to the combination of a single physical processing core and the resources that are dedicated to it alone, in contrast to a PPM, which refers to an entire chip or die, for example. Returning to this example, CMP module 150 also comprises shared cache 162. Although for simplicity only two physical processing cores (158a and 158b) and two logical processing entities (154a and 154b) are shown in FIG. 1b, a CMP module can have any number of physical processing cores each associated with a corresponding logical processing entity.

CMP module 150 can process multiple execution threads concurrently using each of physical processing cores 154a and 154b to process a different execution thread. Each of physical processing cores 154a and 154b appears to operating system 106 as a generic logical processing entity (generic logical processing entities 152a and 152b, respectively) unrelated to any other logical processing entity. Although each of physical processing cores 158a and 158b have their own cache 156a and 156b and own TLBs 160a and 160b, and are therefore relatively independent, they may share shared cache 162.

FIG. 1C shows a block diagram of an SMT module 170 and associated logical processing entities 172a-c. SMT module 170 has physical processing core 173 comprising hardware threads 174a-c. SMT module 170 also has TLB 176 and shared cache 178 used by physical processing core 173. Although only three hardware threads 174a-c and three logical processing entities 172a-c are shown, an SMT module could have any number of hardware threads and logical processing entities.

In general in SMT modules, one physical processing core is shared by several hardware threads in which each hardware thread is represented by a corresponding logical processing entity. As indicated in FIG. 1C, each of hardware threads 174a-c may be associated with a register state of physical processing core 173. Each of generic logical processing entities 172a-c is associated with one of hardware threads 174a-c, respectively, which share physical processing core 173. Physical processing core 173 can process multiple execution threads concurrently using each of hardware threads 174a-c to process a different execution thread. In addition, in SMT module 173, each of hardware threads 174a-c share TLB 176 and cache 178 of physical processing core 173. Hardware threads 174a-c share a data pathway (not shown) with each other. Typically, in SMT modules nearly everything on the PPM is shared by the hardware threads. Each of hardware threads 174a-c is presented to the operating system as a generic logical processing entity (generic logical processing entities 172a-c), without specifying any of the shared resources (e.g., the shared data pathway, physical processing core 173, TLB 178, and cache 178).

FIG. 1D shows a block diagram of a CMT module 190 and associated logical processing entities 190a-n. CMT module 190 has multiple physical processing cores 192a-n, each comprising multiple hardware threads 196a-n. (Thus, there are more hardware threads 196a-n than physical processing cores 192a-n.) In this example, CMT module 190 also has shared cache 194.

Hardware threads 196a-n are distributed into groups, and each group shares one of physical processing cores 192a-n. CMT module 190 can have any number of physical processing cores 192a-n, and each of physical processing cores 192a-n can have any number of hardware threads 196a-n. Shared cache 194 is shared by all physical processing cores 192a-n and their respective hardware threads 196a-n. Each of hardware threads 192a-n that is located on the same one of physical processing cores 192a-n share a data pathway (not shown). Each one of hardware threads 196a-n is presented to the operating system as a generic logical processing entity (generic logical processing entities 190a-n) without specifying which of hardware threads 196a-n share which of physical processing cores 192a-n or the sharing of shared cache 194.

Overview of the Dispatching of Execution Threads in a Non-homogeneous System

Figure 2A:
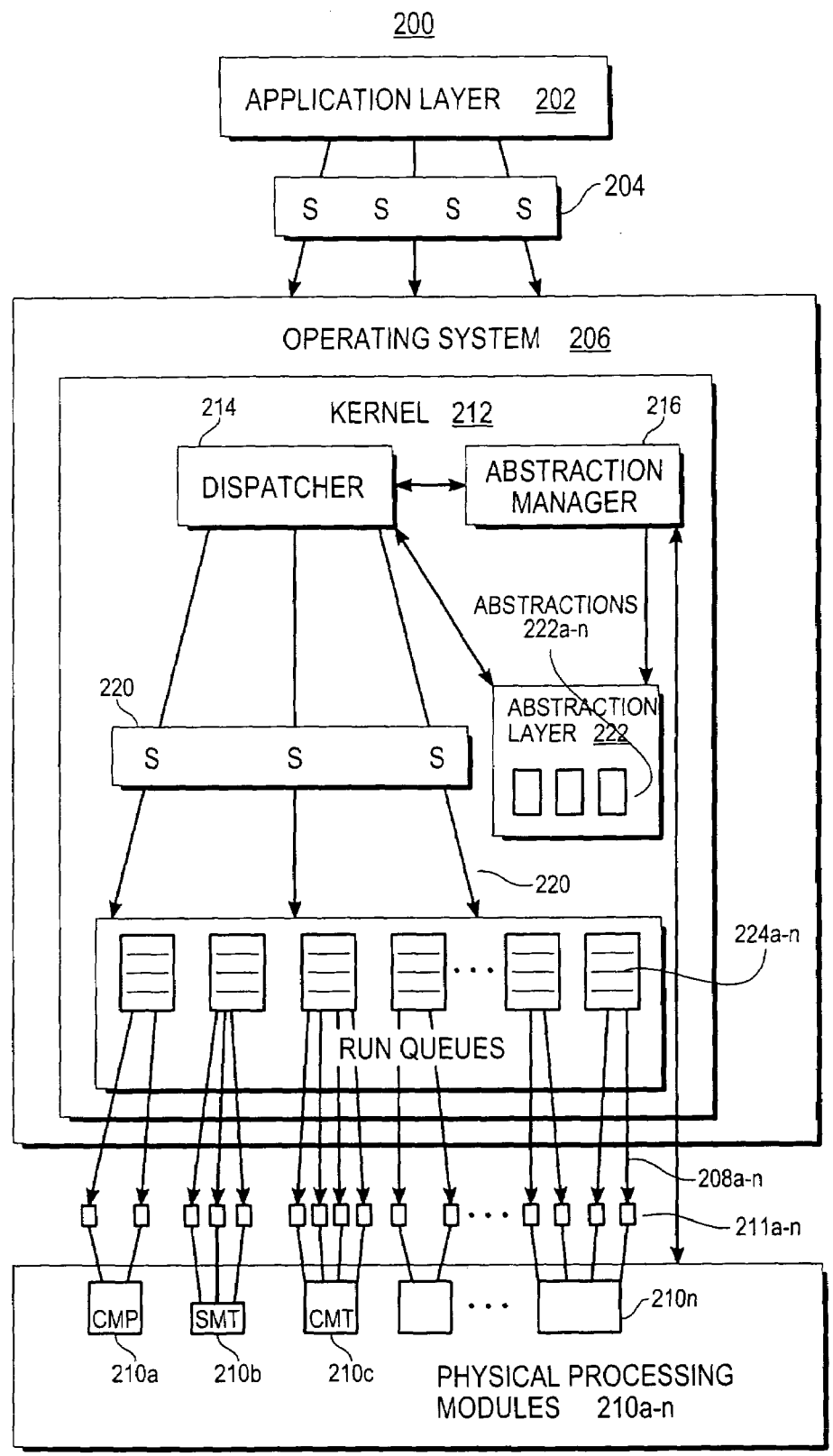
FIG. 2A shows a block diagram of a system, having an operating system dispatching threads to multiple PPMs, according to an embodiment of the present invention.

FIG. 2A shows a block diagram of a system 200, having an operating system dispatching threads to multiple PPMs, according to an embodiment of the invention. System 200 comprises application layer 202, application threads 204, operating system 206, run queue execution threads 208a-n, logical processing entities 211a-n, and PPMs 210a-n. Operating system 206 comprises kernel 212, which comprises dispatcher 214, abstraction manager 216, execution threads 220, abstraction layer 222 having abstractions 222a-n, and run queues 224a-n. In alternative embodiments, system 200 may not comprise all of the features listed above and/or may contain additional features instead of or in addition to the features listed above.

Application layer 202 may be identical to application layer 102, and similarly may comprise one or more applications, each of which may comprise any number of objects and/or routines. For example, application layer 202 may comprise a word processing program, a spreadsheet, a program for developing applications, a database, and/or a server.

Application threads 204 may be identical to application threads 104, and in an embodiment (similar to application threads 104) application threads 204 are generated by application layer 202. In an embodiment, each of application threads 204 corresponds to a task, routine, and/or object associated with an application of application layer 202.

In an embodiment, operating system 206 is software that runs the applications of application layer 202, and acts as an interface between the application of application layer 202 and the hardware on which it resides, such as PPMs 210a-n, memory units, input output devices, buses, and peripherals. In an embodiment, PPMs 210a-n present themselves to operating system 206 as logical processing entities 211a-n. There may be one or multiple logical processing entities for each of PPMs 210a-n. An example of an embodiment of PPMs 210a-n is discussed in conjunction with FIG. 3. Embodiment of other hardware is discussed further in conjunction with FIG. 9.

In an embodiment, kernel 212 comprises the core components that are essential to the operation of operating system 206. In an embodiment, one such component is dispatcher 214, which determines the manner in which run queue execution threads 208a-n are dispatched. Dispatcher execution threads 220 have a correspondence to run queue execution threads 208a-n. The correspondence between dispatcher execution threads 220 and run queue execution threads 208a-n may be one-to-one, and dispatcher execution threads 220 may be identical to run queue execution threads 208a-n differing only in that run queue execution threads 208a-n have already been scheduled and may be in the process of being removed from run queues 224a-n to be run on PPMs 210a-n. Dispatcher execution threads 220 and run queue execution threads 208a-n differ from application threads 204 in that dispatcher execution threads 220 and 208a-n may comprise execution threads associated with the objects and/or routines of operating system 206. In an embodiment, dispatcher execution threads 220 may be just representations of run queue execution threads 208a-n used for dispatching run queue execution threads 208a-n to run queues 224a-n. In an embodiment, the dispatching of dispatcher execution threads 220 determines a corresponding dispatch of run queue execution threads 208a-n. Dispatcher 214 dispatches dispatcher execution threads 220 across PPMs 210a-n to achieve an optimum balance of the workload. In an embodiment, dispatcher 214 updates abstractions 222a-n with changes in the workload by for example, incrementing or decrementing a counter associated with abstractions 222a-n, representing the number of threads in one of run queues 224a-n and/or information related to a workload associated with one or PPMs 210a-n. Dispatcher 214 differs from dispatcher 114 in that it is enabled to communicate with and take advantage of abstraction layer 222 and abstraction manager 216.

In an embodiment, abstraction manager 216 creates and manages abstractions 222a-n, (which are abstractions of PPMs 210a-n). In an embodiment, these are the only abstractions managed by abstraction manager 216. In an alternative embodiment, abstraction manager 216 may be part of another abstraction manager that manages other abstractions or may itself manage other abstractions. In creating abstractions 222a-n, abstraction manager 216 interacts with PPMs 210a-n, and/or stored data related to the characteristics of PPMs 210a-n. Abstraction manager 216 may manage abstractions 222a-n by updating parameters of abstractions 222a-n as the processing load changes, for example. In managing abstractions 222a-n, abstraction manager 216 may interact with run queues 224a-n, and/or PPMs 210a-n. In an alternative embodiment, abstraction manager 216 may update abstractions 222a-n regarding the workload associated with each run queue and/or PPM instead of, or in addition to, the update performed by dispatcher 216. In an embodiment, abstraction manager 216 may be a separate module from dispatcher 214 as shown in FIG. 2A, or may located within dispatcher 214.

In an embodiment, abstractions 222a-n are abstractions of, and have a correspondence to, PPMs 210a-n, which may be, but are not limited to, a one-to-one correspondence. In an embodiment, at least part of the way that abstractions 222a-n characterize PPMs 210a-n is by comprising parameters characterizing various characteristics associated with PPMs 210a-n. In an embodiment, the parameters of abstractions 222*a-n* correspond to the load capacity, performance capabilities, and the resources available to each of the logical processing entities of PPMs 210*a-n*, for example. In an embodiment, the parameters of abstractions 222*a-n* differentiate abstractions 222*a-n* from one another and reflect at least one of, some of, or all of the differences between the logical processing entities as determined by their PPMs 208*a-n*. Abstractions 222*a-n* may comprise other parameters characterizing PPMs 210*a-n*. The parameters and structure of embodiments of abstractions 222*a-n* are also discussed below in connection with FIG. 4. In an embodiment, abstractions 222*a-n* allow dispatcher 214 to determine an optimum distribution of threads by balancing the loads associated with running each thread on each of PPMs 210*a-n* while taking into account the distribution of run queues 224*a-n*, the sharing of resources, and other parameters that affect scheduling considerations, characterized by the parametric information of abstractions 222*a-n*.

Abstractions 222*a-n* may be data structures or in an alternative embodiment may be objects that actively update themselves and/or participate in the scheduling of execution threads 220. Each of abstractions 222*a-n* may be a separate data structure, or abstraction layer 222 may be one data structure having each of abstractions 222*a-n* as separate portions. Using abstractions 222*a-n*, dispatcher 214 schedules dispatcher execution threads 220 on run queues 224*a-n*. More details of embodiments of operating system 206 are discussed below in conjunction with FIG. 2B.

In one embodiment, run queues 224*a-n* are buffers for storing run queue execution threads 208*a-n*. In one embodiment, run queues 224*a-n* may be First In First Out (FIFO) buffers. In an embodiment, when each of PPMs 210*a-n* is ready to accept another one of run queue execution threads 208*a-n* to run, the PPM goes to one of run queues 224*a-n* to determine the next execution thread to run, and processes the corresponding execution thread. PPMs 210*a-n* may comprise any combination of different types of PPMs, which may differ in the number threads they can handle, the number of physical processing cores, the resources such as cache allocated to each physical processing core, the clock speed, and/or the type of PPM for example. Any of run queues 224*a-n* may service one or multiple logical processing entities. Although in FIG. 2A only PPM 210*n* has more than one of run queues 224*a-n* servicing it, any given one of run queues 224*a-n* may service only some of the logical processing entities of a PPM, and/or any given one of run queues 224*a-n* may service multiple PPMs (and their associated logical processing entities).

More Details of an Embodiment of the Operating System

Figure 2B:
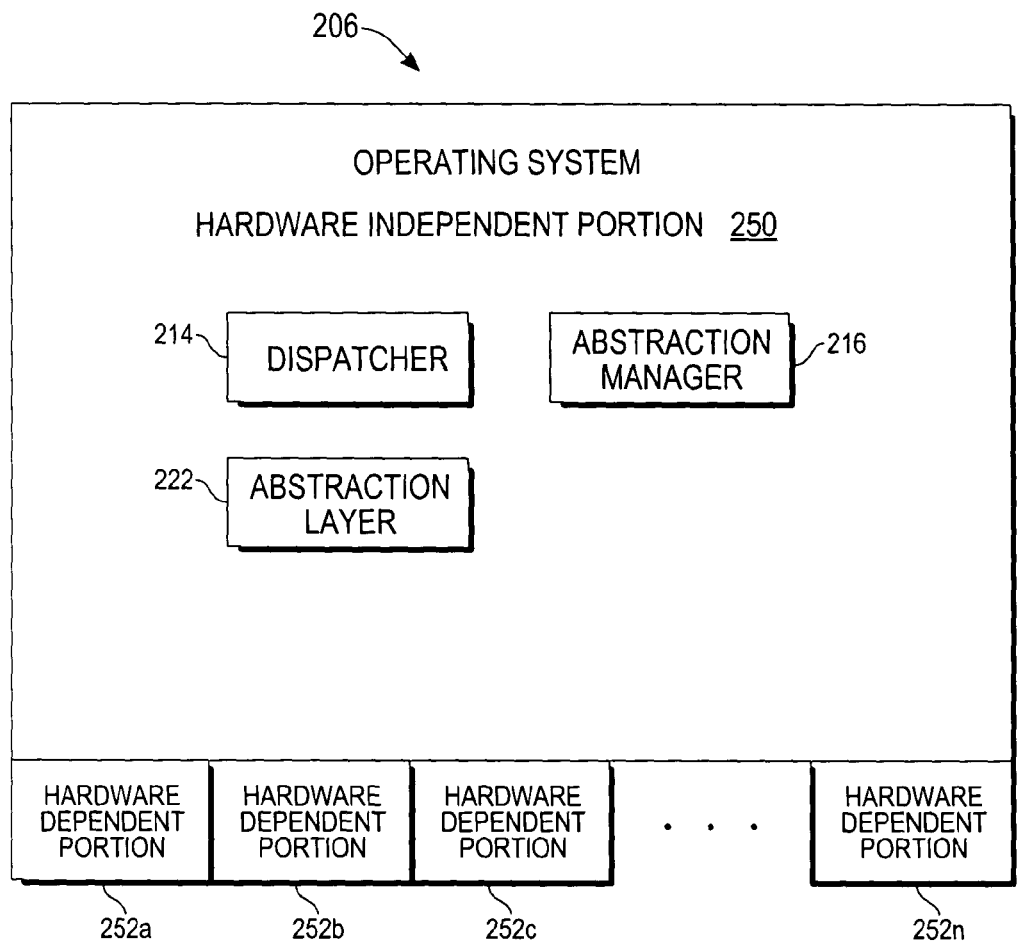
FIG. 2B shows a block diagram of another view of the operating system of FIG. 2A, according to an embodiment of the invention.

FIG. 2B shows a block diagram of another view of an embodiment of operating system 206, which comprises hardware independent portion 250 and hardware dependent portions 252*a-n*. Hardware independent portion 250 comprises the dispatcher 214, the abstraction manager 216, and the abstraction layer 222 discussed above in conjunction with FIG. 2A. In alternative embodiments, operating system 206 may not comprise all of the features listed above and/or may contain additional features instead of or in addition to the features listed above.

In an embodiment, hardware dependent portions 252*a-n* each interface with one or more specific pieces of hardware. In an embodiment, at least some of hardware dependent portions 252*a-n* interface with PPMs 210*a-n*. In an embodiment, abstraction manager 216 accesses PPMs 210*a-n* via at least some of hardware dependent portions 252*a-n* to obtain parametric information about physical modules 210*a-n*, such as the clock speed, the number of physical processing cores, the number of hardware threads, and shared resource information (e.g., if a cache, data pathway, TLB, or other resource is shared). In an embodiment, abstraction manager 216 accesses hardware dependent portions 252*a-n* prior to and/or while constructing abstractions 222*a-n*. The information obtained comprises information related to characteristics of PPMs 210*a-n*, and is used for constructing abstractions 222*a-n*. In an alternative embodiment, abstraction manager 216 may also access PPMs 210*a-n*, via hardware dependent portions 252*a-n*, while dispatcher execution threads 220 are being dispatched, and the information obtained may also comprise dynamic or changing information that relates to the current states of the PPMs 210*a-n* and their availability to process new execution threads.

Example of PPMs 210*a-n*

Figure 3:
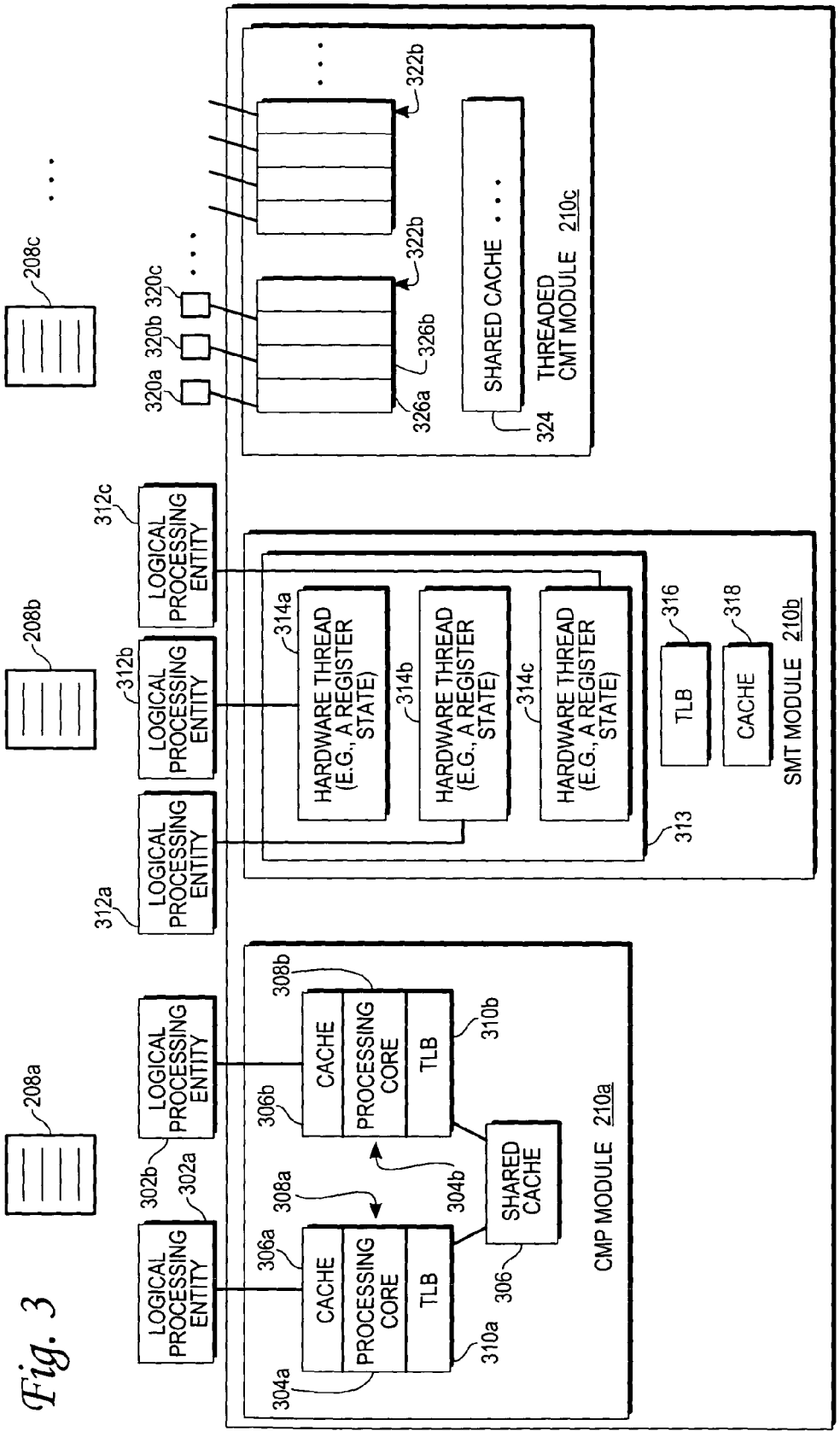
FIG. 3 shows a block diagram of an example of PPMs that can be used in the system of FIG. 2A, according to an embodiment of the invention.

FIG. 3 shows a block diagram of an example of PPMs 210*a-n*, associated logical processing entities 302*a* and 302*b*, 312*a-c*, and 320*a-n*, and run queues 208*a-n*. In this example, PPMs 210*a-c* are CMP module 210*a*, SMT module 210*b*, and CMT module 210*c*, respectively. CMP module 210*a* is associated with logical processing entities 302*a* and 302*b*, and CMP module 210*a* comprises physical processing entities 304*a* and 304*b*, and shared cache 306. Physical processing entities 304*a* and 304*b* have caches 306*a* and 306*b*, physical processing cores 308*a* and 308*b*, and TLBs 310*a* and 310*b*, respectively. SMT module 210*b* comprises logical processing entities 312*a-c*, hardware threads 314*a-c*, TLB 316, and cache 318. CMT module 210*c* has logical processing entities 320*a-n*, physical processing cores 322*a-n*, and cache 324. Comprised in physical processing cores 322*a-n* are hardware threads 326*a-n*. The remaining PPMs and run queues of PPMs 210*a-n* are not shown. Other embodiment of PPMs 210*a-n* may not have all of the features listed above, or may have other features in addition to and/or instead of those listed above.

Only a small number of physical processing cores, hardware threads, and their corresponding logical processing entities are illustrated in order to simplify FIG. 3. However, there may be any number of PPMs each having any number of hardware threads, physical processing cores, related components, and/or other components. FIG. 3 is just one example of a configuration of PPMs. Similarly, CMP module 210*a*, SMT module 210*b*, and CMT module 210*c* are each just one example of a CMP, an SMT, and a CMT module, respectively. CMP module 210*a*, SMT module 210*b*, and CMT module 210*c* may be identical to CMP module 150, SMT module 170, and CMT module 190, respectively. Alternatively, CMP module 210*a*, SMT module 210*b*, and CMT module 210*c* and CMP module 150, SMT module 170, and CMT module 190, respectively may differ in the number of physical processing cores, hardware threads, and resources shared. The example, of FIG. 3 illustrates some of the variety of different types of PPMs that PPMs 210*a-n* may comprise, which operating system 206 can handle efficiently. Additionally, FIG. 3 is an example of some of the variety of ways in which resources are shared.

As examples of resource sharing, shared cache 306 is a shared resource of logical processing entities 302*a* and 302*b* of CMP module 210*a*. Alternative embodiments CMP module 210*a* may not comprise shared cache 306 and/or may comprise a shared data pathway. TLB 316, cache 318, the physical processing core 313, and nearly all resources of SMT module 210*b* are shared resources of hardware threads 314*a-c* and therefore are shared resources of logical processing entities 312*a-c*.

As additional examples of resource sharing, in CMT module 210c, in an embodiment, there is one logical processing entity for each hardware thread 326a-n. Each group of hardware threads 326a-n and their corresponding logical processing entities 320a-n of CMT module 210c share one of physical processing cores 320a-n. Additionally, in an embodiment, all hardware threads 326a-n and their corresponding logical processing entities 320a-n share cache 324 (no matter which of physical processing cores 326a-n they share). In alternative embodiments, each physical processing core 320a-n may have its own TLB and/or cache shared among its threads. Alternative embodiments of CMT module 210c may not comprise shared cache 324 and/or may comprise a shared data pathway.

Physical processing cores 304a and 304b of CMP module 210a, physical processing cores 314a-c of SMT module 210b, and hardware threads 326a-n of CMT module 210c interface with operating system 206 and its run queues 208a-n via logical processing entities 302a and 302b, 312a-c, and 320a-n, for example. The manner of operation of CMP module 210a, SMT module 210b, and CMT module 210c are understood by those of ordinary skill in the art, and further details will not be given here.

Structure of Embodiments of Abstractions

Figure 4:
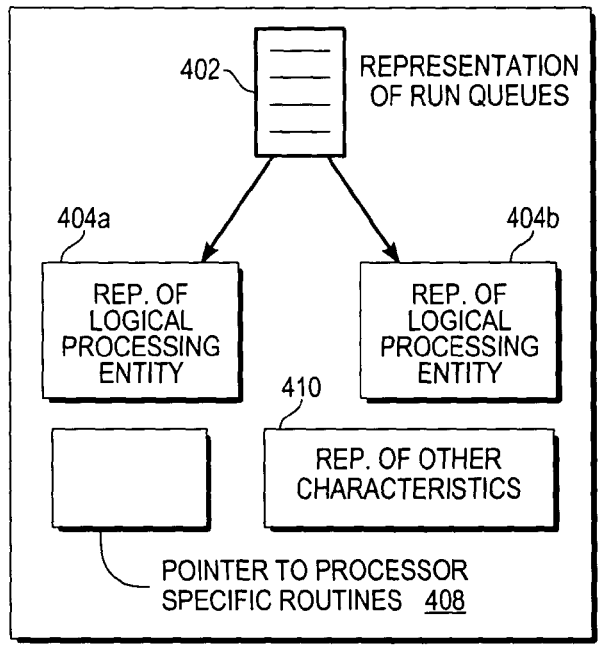
FIG. 4 shows a block diagram of an example of an abstraction of the abstraction layer of FIG. 2A, according to an embodiment of the invention.

FIG. 4 shows a block diagram of an abstraction 400. Abstraction 400 comprises a representation of run queue 402, a representation of logical processors 404a and 404b, a pointer to processor specific routines 408, and representations of other characteristics 410. In alternative embodiments, abstraction 400 may not comprise all of the features listed above and/or may contain additional features instead of or in addition to the features listed above.

Abstraction 400 is an example of an embodiment of one of abstractions 222a-n. Representation of run queue 402 represents one or more of run queues 224a-n. In an embodiment, abstractions store information defined by a relationship (e.g., sharing) between the logical processing entities presented by the PPMs. Abstractions may additionally or alternatively store information defined by operational characteristics of and/or associated with a particular PPM. In an embodiment, the relationship and/or operational characteristics allow clients of the abstraction to access information regarding, and benefit from, the sharing relationships between logical processing entities, such as which resources are shared by whom. In an embodiment, the relationship and/or operational characteristics allow clients of the abstraction to access information regarding which logical processing entities map to which PPMs. In an embodiment, the relationship and/or operational characteristics allow clients of the abstraction to access the salient operational characteristics of a particular PPM. In an embodiment, the relationship and/or operational characteristics allow the dispatcher, in particular, to achieve a better utilization of resources, to better perform load balancing and to make better use of an execution thread's data investment in shared or other caches.

In an embodiment, representation of run queue 402 may comprise information such as which of PPMs 210a-n is associated with the run queues of run queues 222a-n being represented by representation of run queue 402. Representation of run queue 402 may comprise information about the capacity of the corresponding one of run queues 224a-n, such as how many execution threads it can each accept, and how many execution threads are currently in the run queue corresponding to representation of run queue 402.

In an embodiment, representation of logical processing entities 404a and 404b represent the logical processing entities of the one or more of PPMs 210a-n corresponding to abstraction 400. In an embodiment, representations of logical processing entities 404a and 404b may comprise information such as whether the corresponding logical processing entity is available for accepting a new thread, and information related to which PPM and run queue the corresponding one of logical processing entities 320a-n is associated. Although two representations of logical processing entities are illustrated, abstraction 400 may contain any number of representations of logical processing entities.

In an embodiment, pointer to processor specific routines 408 may comprise one or more pointers to one or more scheduling routines or other routines, which may be stored elsewhere. (The actual processor specific routines are not shown.) For example, the processor specific routines may be stored in main memory (discussed below in conjunction with the hardware overview of FIG. 9), and may be transferred to a dynamic memory and/or a local cache while the hardware specific routine is running. In an embodiment, representation of other characteristics 410 may comprise the remaining parameters of abstraction 400, which may comprise variables that change as the load on and/or resources available to PPMs 208a-n changes. Some examples of possible parameters for abstractions 222a-n are clock speed, the number of cores, the number of logical processing entities (the number of concurrent threads that can be handled), and/or chip architecture. Some examples of chip architecture that may be comprised as parameters are the type of chip such as CMT, CMP, or SMT, and/or shared resources. Some examples of resources that may be shared are an arithmetic unit, a cache, a Translation Lookaside Buffer (TLB), another buffer, and/or another memory. Some more examples of shared resources that may be indicated by parameters are whether the chip contains two logical processing entities sharing one physical processor. The sharing of run queues may also be indicated in the parameters of abstraction 400. In an embodiment, application layer 202 may be a client of abstractions 222a-n in addition to or instead of dispatcher 214. In an embodiment, using abstractions 222a-n, applications 202 can decide which routines or threads to direct towards which processors and/or otherwise better manage the resources of PPM 210a-n available to it.

Run Queue Distribution of Load

Figure 5:
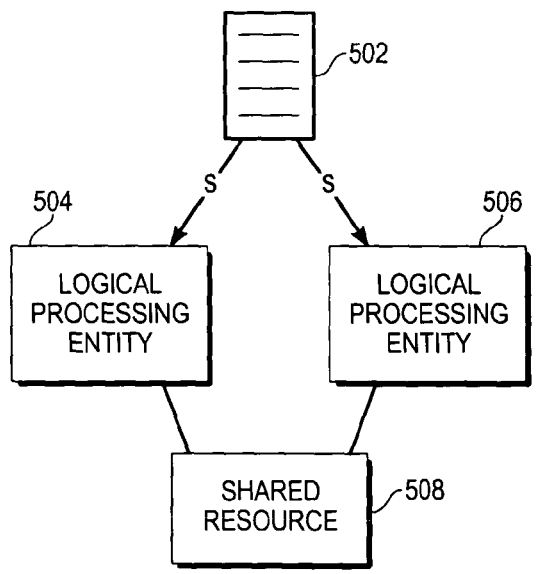
FIG. 5 shows a block diagram of an example of a run queue load distribution subsystem of FIG. 2A, according to an embodiment of the invention.

FIG. 5 shows, as an example, a block diagram of a run queue load distribution subsystem 500, comprising run queue 502, PPMs 504 and 506, and shared resource 508. In alternative embodiments, run queue load distribution subsystem 500 may not comprise all of the features listed above and/or may contain additional features instead of or in addition to the features listed above.

Run queue 502 is an example of one of run queues 224a-n servicing multiple ones of PPMs 210a-n, which in this example are PPMs 504 and 506. The first of PPM 504 or 506 that is ready to accept another thread, grabs the next execution thread associated with run queue 502. In an embodiment, the grouping of PPMs 210a-n to run queues 224a-n is at least in part dependent upon the sharing of resources. In the present example, PPMs 504 and 506 share a resource labeled shared resource 508, which may be a shared cache, a shared TLB or a shared data pathway, for example. In an embodiment, run queues 224a-n of this example were set up such that PPMs 504 and 506 share run queue 502, because PPMs 504 and 506 share shared resource 508. The shared resource 508 may place a limit on the number of threads the combination of physical processors 504 and 506 can handle or may introduce scheduling requirements necessary to take advantage of a current configuration of the shared resource, such as the information already stored in a cache if the shared resource is cache.

In an embodiment, the distribution of run queues 224a-n is chosen to optimize the load balancing among PPMs 210a-n, and performs one part of the load balancing, thereby reducing the computations associated with the part of the load balancing (a second part) performed by dispatcher 214. In other words, in an embodiment, the load balancing is performed in two parts in which the first part is performed by dispatcher 214 and the second part is performed by the distribution of run queues 224a-n. The use of the two part load balancing facilitates a quicker dispatching process, which is optimally load-balanced.

In an embodiment, the abstractions 222a-n may have a one-to-one correspondence to run queues 224a-n. In an embodiment, each abstraction of abstractions 222a-n may be an abstraction of the combined characteristics of PPMs 208a-n that are assigned to the run queue of run queues 224a-n that corresponds the abstraction in question. In an embodiment, in this manner, a two part load balancing can also be efficiently accomplished.

The Operation of System 200

Figure 6:
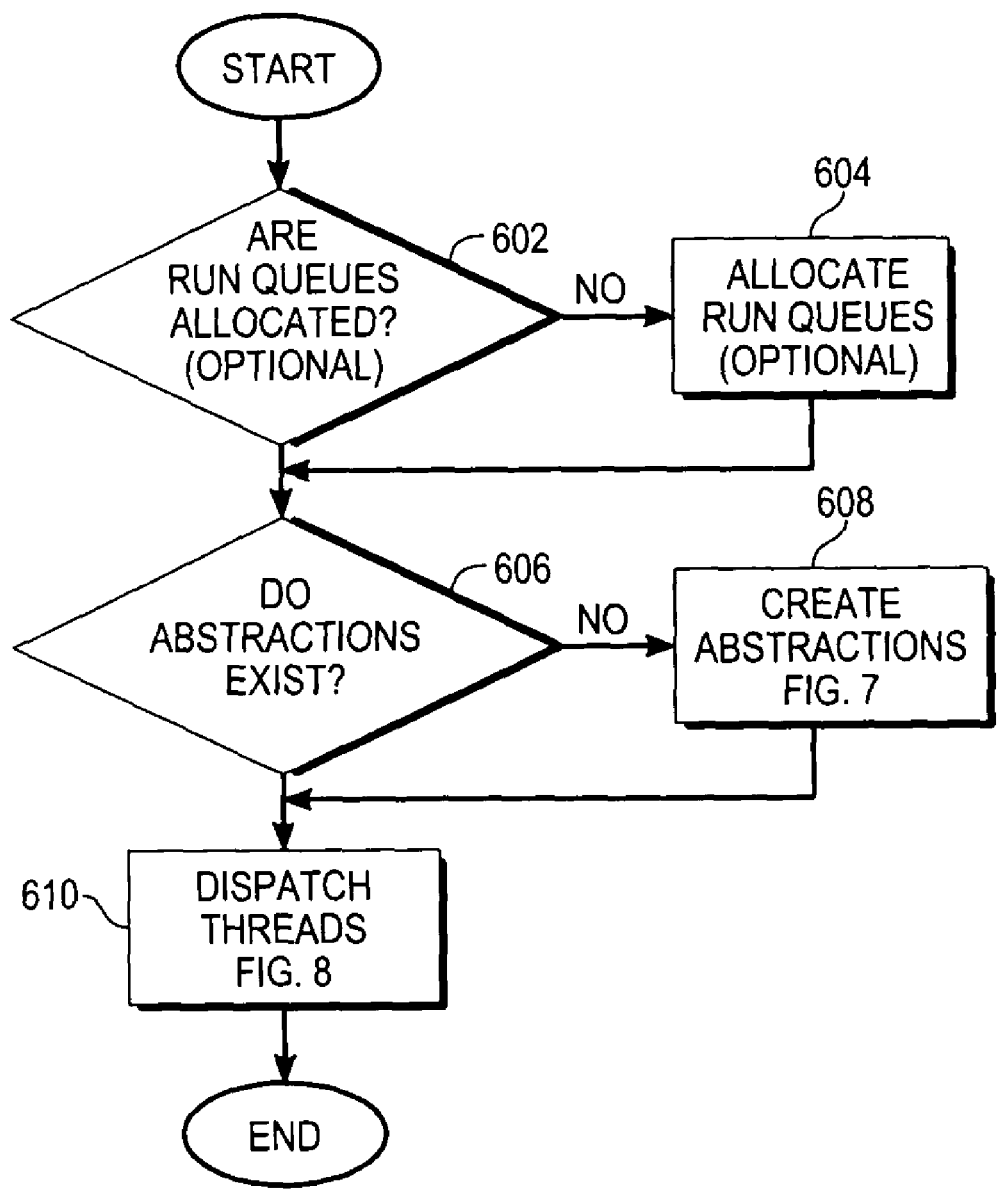
FIG. 6 shows a flowchart of a method for running the operating system of FIG. 2A, according to an embodiment of the invention.

FIG. 6 shows a flowchart of an embodiment of a method 600 for running the operation of the operating system 206. Decision 602 and step 604 are optional. In an embodiment having decision 602, a determination is made in decision 602 whether run queues 222a-n have been allocated. If run queues 224a-n have not been allocated, dispatcher 216 or another module allocates run queues 224a-n, and the method continues with decision box 606. Run queues 224a-n are distributed among PPMs 210a-n such that at least some of those of PPMs 210a-n that have shared common resources also share run queues 224a-n, thereby performing one part of the optimization of the balancing of the load associated with running run queue execution threads 208a-n. If run queues 224a-n have been allocated, method 600 continues with decision box 606, skipping step 604. In an embodiment, in decision 606, a determination is made whether abstractions 222a-n exist, and/or whether abstractions 222a-n agree with the most recent upgrade of PPMs 210a-n. If abstractions 222a-n do not exist or have not been updated to agree with the most recent upgrades to PPMs 210a-n, in an embodiment, the method continues with step 608 in which abstractions 222a-n are created or updated as shown in method 700 of FIG. 7, below, and then method 600 continues with step 610. In an embodiment, if abstractions do exist and have been updated, method 600 continues with step 610, skipping step 608. After decision 606 or step 608, in step 610, dispatcher 212 dispatches run queue execution threads 208a-n, according to method 800 of FIG. 8.

Method 600 may only need to be performed once after the physical installation of new or additional PPMs 210a-n, or after the upgrading of or the addition of more run queues 224a-n. Alternatively, method 600 may be performed each time application threads need to be dispatched.

Figure 7:
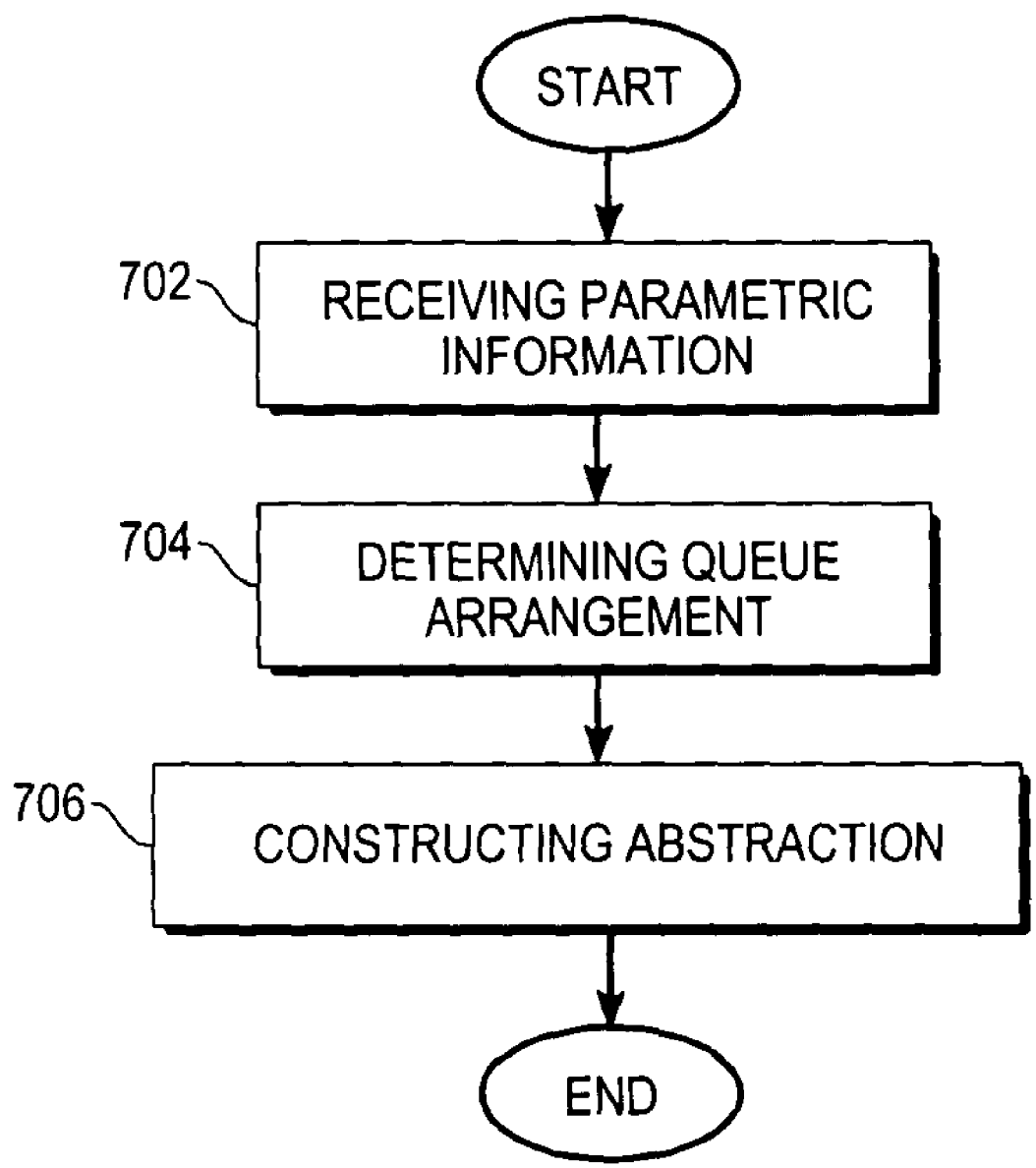
FIG. 7 shows a flowchart of a method for creating abstractions, according to an embodiment of the invention.

FIG. 7 shows a flowchart of an embodiment of a method 700 for creating abstractions 222a-n. If abstractions 222a-n have not been created, control is passed from dispatcher 214 to abstraction manager 216 for implementation of method 700. In an embodiment, in step 702, abstraction manager 216 checks PPMs 210a-n and/or data stored comprising parameters related to PPMs 210a-n to obtain parameters (i.e., receive parametric information) appropriate to characterize each of PPMs 210a-n. In an embodiment, in step 704, abstraction manager 216 checks run queues 224a-n or information stored about run queues 224a-n, and makes a determination of the distribution of run queues 224a-n with respect to PPMs 210a-n. In an embodiment, in step 706, using the information gathered regarding the modeling of PPMs 210a-n and run queues 224a-n, abstraction manager 216 creates abstractions 222a-n.

Figure 8:
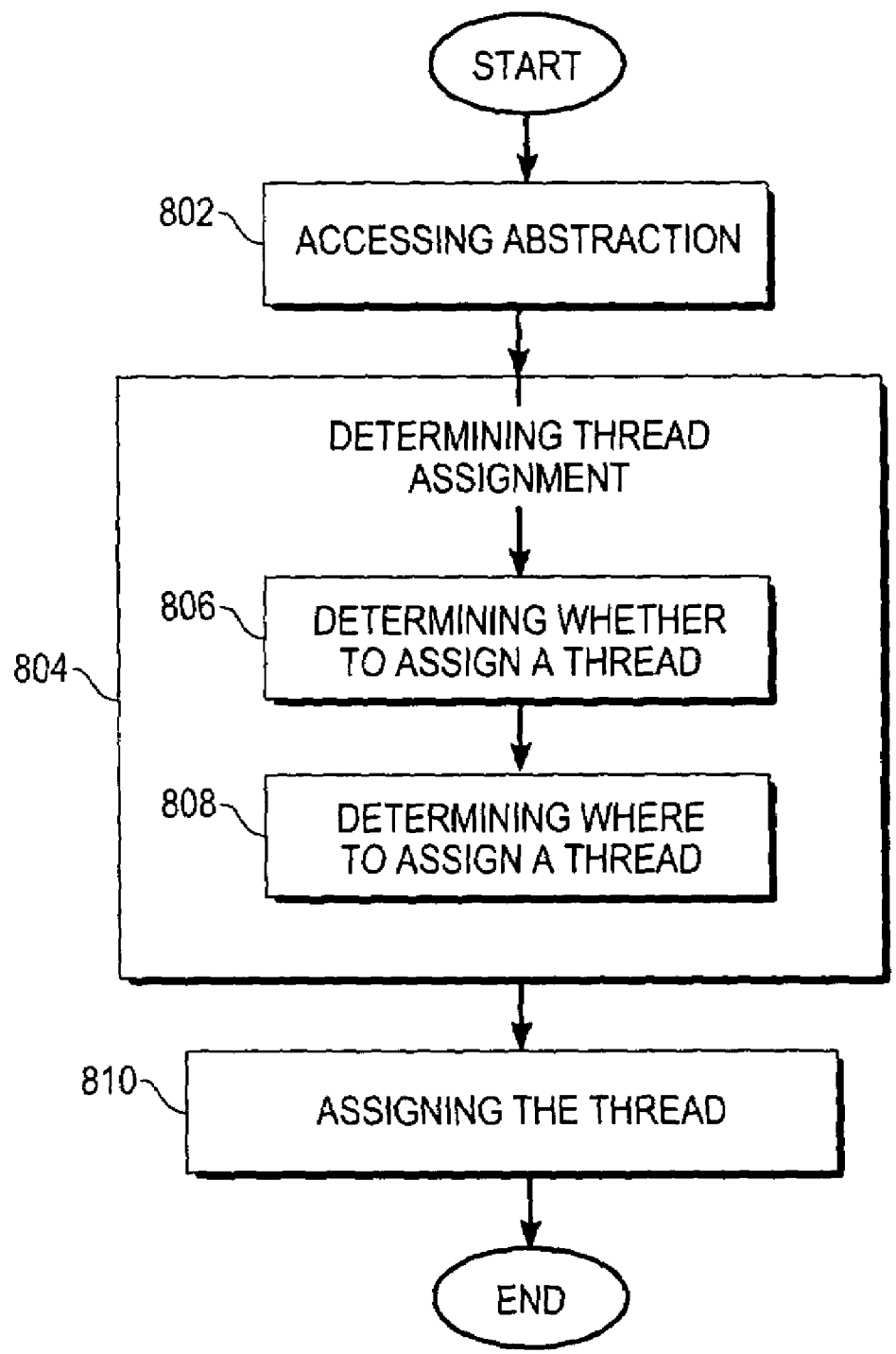
FIG. 8 shows a flowchart of a method for dispatching execution threads, according to an embodiment of the invention.

FIG. 8 shows a flowchart of an embodiment of a method 800 for dispatching execution threads. In an embodiment, in step 802, dispatcher 214 accesses abstractions 222a-n to get information about PPMs 210a-n. In an embodiment, in step 804, a determination is made about thread assignment. Step 804 comprises sub-steps 806 and 808. In an embodiment, in sub-step 806, a determination is made by dispatcher 214 whether to assign one of execution threads 220. The determination of whether to assign one of dispatcher execution threads 220 may be based on abstractions 222a-n, the current overall processing load, and/or whether there are any applications running and generating applications threads 204. In an embodiment, in sub-step 808, a determination is made by dispatcher 214 using abstractions 222a-n regarding where to assign one or more dispatcher execution threads 220 among PPMs 210a-n, thereby determining to which of run queues 222a-n to assign one of execution threads 220. In an embodiment, the abstractions 222a-n are used in this determination to optimally balance the loads associated with dispatcher execution threads 220 among run queues 224a-n, thereby accomplishing one part of the load balancing of threads 208a-n. For those of abstractions 222a-n having pointers to hardware specific routines (if any such abstractions exist), the hardware specific routines are executed as part of determining where to assign one or more of execution threads 220. In an embodiment, in step 810, dispatcher execution threads 220 are assigned. As each of PPMs 210a-n is ready to accept another thread, it grabs the next execution thread in a queue associated with the one of run queues 224a-n assigned to that PPM.

Hardware Overview

Figure 9:
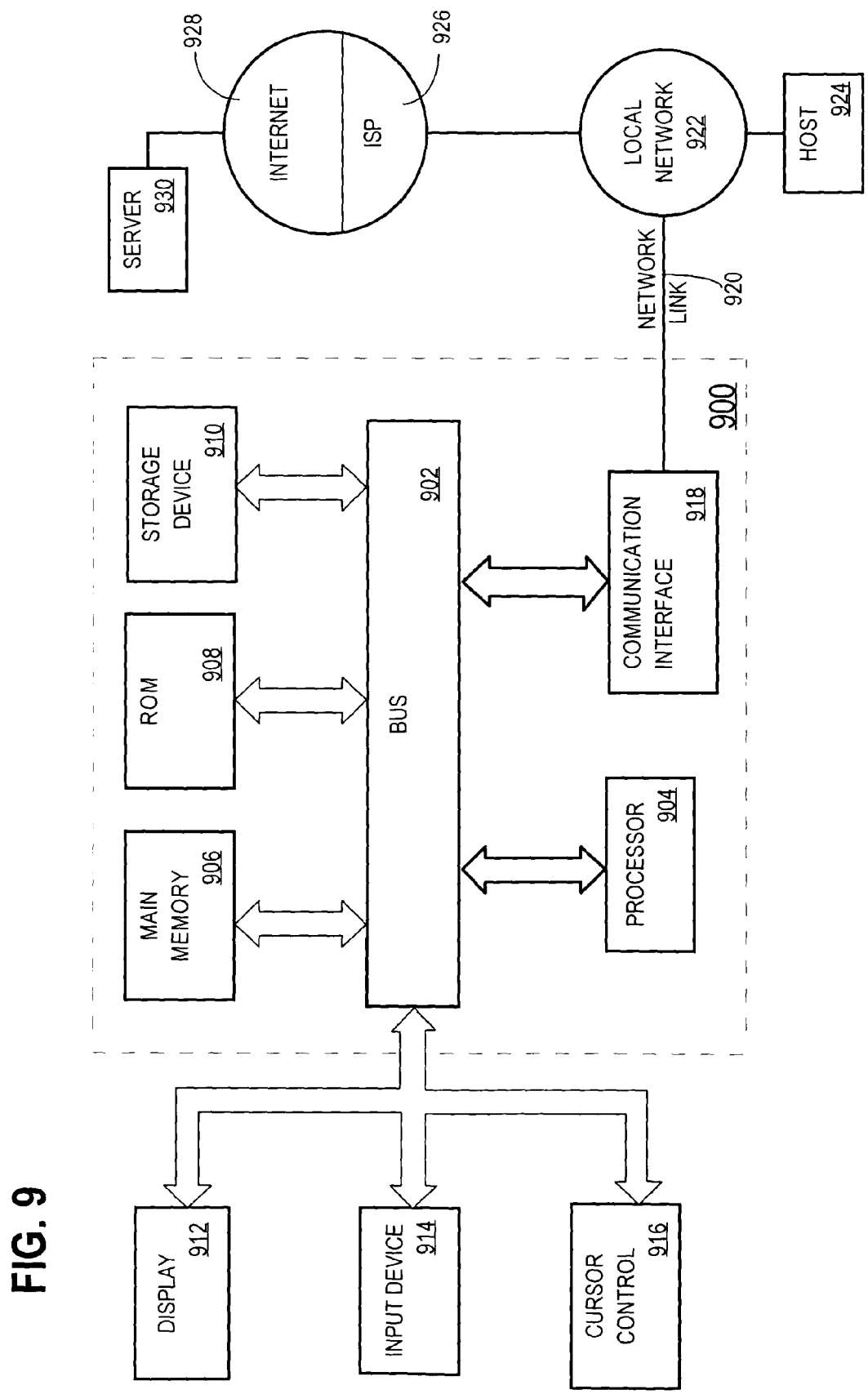
FIG. 9 shows a block diagram of a hardware overview of a computer system, which may be used to execute the operating system of FIG. 2A, according to an embodiment of the invention.

In one embodiment, the various components shown in FIG. 2 (e.g., dispatcher 214, abstraction manager 216, and abstractions layer 222) are implemented by sets of instructions executable by one or more processors of PPMs 210a-n. These components may be implemented as part of an object oriented programming system, comprising but not limited to the JAVA™ programming system manufactured by Sun Microsystems, Inc., C, C++, compiled languages, interpreted languages, assembly language, or machine language. FIG. 9 shows a block diagram of a hardware overview of a computer system 900, which may be used to execute these components. Computer system 900 comprises a bus 902 or other communication mechanism for communicating information, and a processing unit 904 coupled with bus 902 for processing information. Processing unit 904 comprises PPMs 210a-n. Computer system 900 also comprises a main memory 906, such as a random access memory (RAM) or other dynamic storage device, coupled to bus 902 for storing information and instructions to be executed by processing unit 904. Main memory 906 may also be further used to store temporary variables or other intermediate information during execution of instructions by processing unit 904. Computer system 900 further comprises a read only memory (ROM) 908 or other static storage device coupled to bus 902 for storing static information and instructions for processing unit 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, comprising alphanumeric and other keys, is coupled to bus 902 for communicating information and command selections to processing unit 904. Another type of user input device is cursor control 916, such as a mouse, a trackball, or cursor direction keys for communicating direction information and command selections to processing unit 904 and for controlling cursor movement on display 912. This input device typically has two degrees of freedom in two axes, a first axis (e.g., x) and a second axis (e.g., y), that allows the device to specify positions in a plane.

According to one embodiment, the functionality of the present invention is provided by computer system 900 in response to processing unit 904 executing one or more sequences of one or more instructions contained in main memory 906. Executing the sequences of instructions may be performed by running run queue execution threads 208a-n and on PPMs 210a-n of processing unit 904. Thus, comprised in run queue execution threads 208a-n are execution threads for operating system 206, such as execution thread related to dispatcher 214 and/or abstraction manager 216. Such instructions may be read into main memory 906 from another computer-readable medium, such as storage device 910. Execution of the sequences of instructions contained in main memory 906 causes processing unit 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing unit 904 for execution. Such a medium may take many forms, comprising non-volatile media and/or volatile media. Non-volatile media comprises, for example, optical or magnetic disks, such as storage device 910. Volatile media comprises dynamic memory, such as main memory 906.

Common forms of computer-readable media comprise, for example, a floppy disk, a flexible disk, a hard disk, a magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of computer readable media may be involved in carrying one or more sequences of one or more instructions to processing unit 904 for execution. For example, the instructions may initially be carried on a magnetic disk of a remote computer. The remote computer can load the instructions into its dynamic memory and send the instructions to computer system 900. Bus 902 of computer system 900 carries the data to main memory 906, from which processing unit 904 retrieves and executes the instructions. The instructions received by main memory 906 may optionally be stored on storage device 910 either before or after execution by processing unit 904.

Computer system 900 also comprises a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are examples of forms of carrier waves transporting the information.

Computer system 900 can send messages and receive data, comprising program code, through the network(s), network link 920 and communication interface 918. In the Internet example, a server 930 might transmit a requested code for an application program or other code, such as code for operating system 206, dispatcher 214, and/or abstraction manager 216, through Internet 928, ISP 926, local network 922 and communication interface 918. The received code may be executed by processing unit 904 as it is received, and/or stored in storage device 910, or other non-volatile storage for later execution. In this manner, computer system 900 may obtain application or other code in the form of a carrier wave.

At this point, it should be noted that although the invention has been described with reference to various embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method performed by an operating system executing within a computer system having different types of physical processing modules, the method comprising:

receiving a first set of parametric information pertaining to a first physical processing module (PPM), the first PPM having a first architecture;

constructing a first abstraction of the first PPM based, at least partially, upon the first set of parametric information, the first abstraction comprising an indication of how many logical processing entities are provided by the first PPM, the first abstraction further comprising operational information indicating one or more operational characteristics of the first PPM;

determining that a second abstraction for a second PPM does not exist the second PPM having a second architecture, wherein the first architecture is different from the second architecture;

receiving a second set of parametric information pertaining to the second PPM;

constructing the second abstraction of the second PPM based, at least partially, upon the second set of parametric information, the second abstraction comprising an indication of how many logical processing entities are provided by the second PPM, the second abstraction further comprising operational information indicating one or more operational characteristics of the second PPM, wherein the second abstraction is different from the first abstraction to reflect at least one difference between the first architecture of the first PPM and the second architecture of the second PPM; and dispatching, based on the at least one difference between the first architecture of the first PPM and the second architecture of the second PPM and the operational information in the first abstraction, an execution thread for execution to one of the logical processing entities of the first PPM.

2. The method of claim 1, wherein the first PPM comprises a first physical processing core which supports a single hardware thread, wherein the second PPM comprises a second physical processing core which supports a plurality of hardware threads, wherein constructing the first abstraction comprises indicating the first physical processing core as a single logical processing entity, and wherein constructing the second abstraction comprises indicating the second physical processing core as a plurality of logical processing entities.

3. The method of claim 2, wherein constructing the second abstraction comprises indicating that the plurality of logical processing entities corresponding to the second physical processing core share one or more resources of the second PPM.

4. The method of claim 1,
wherein the first PPM has an n number of processing cores, where n is an integer greater than one, each of the n processing cores capable of supporting one hardware thread; and
wherein the second PPM has a single processing core capable of supporting an m number of hardware threads, where m is an integer greater than one.

5. The method of claim 4, wherein the first abstraction indicates that the first PPM provides an n number of logical processing entities, and wherein the second abstraction indicates that the second PPM provides an m number of logical processing entities.

6. The method of claim 5, wherein the operational information of the first abstraction includes resource sharing information indicating one or more resources shared by the n logical processing entities of the first PPM, and wherein the operational information of the second abstraction includes resource sharing information indicating one or more resources shared by the m logical processing entities of the second PPM.

7. The method of claim 6, wherein the resource sharing information of the first abstraction indicates that the n logical processing entities of the first PPM share a cache, and wherein the resource sharing information of the second abstraction indicates that the m logical processing entities of the second PPM share one or more of the following: a processing core, a data pathway, a translation lookaside buffer, and a cache.

8. The method of claim 1,
wherein the first PPM has an n number of processing cores, where n is an integer greater than one, each of the n processing cores capable of supporting one hardware thread; and
wherein the second PPM has an m number of processing cores, wherein m is an integer greater than one, each of the m processing cores capable of supporting a p number of hardware threads, where p is an integer greater than one.

9. The method of claim 8, wherein the first abstraction indicates that the first PPM provides an n number of logical processing entities, and wherein the second abstraction indicates that the second PPM provides an s number of logical processing entities, where s=m times p.

10. The method of claim 9, wherein the operational information of the first abstraction includes resource sharing information indicating one or more resources shared by then logical processing entities of the first PPM, and wherein the operational information of the second abstraction includes resource sharing information indicating one or more resources shared by at least some of the s logical processing entities of the second PPM.

11. The method of claim 10, wherein the resource sharing information of the first abstraction indicates that the n logical processing entities of the first PPM share a cache, and wherein the resource sharing information of the second abstraction indicates that at least some of the s logical processing entities of the second PPM share one or more of the following: a processing core, a data pathway, a translation lookaside buffer, and a cache.

12. The method of claim 1,
wherein the first PPM has a single processing core capable of supporting an n number of hardware threads, where n is an integer greater than one; and
wherein the second PPM has an m number of processing cores, wherein m is an integer greater than one, each of the m processing cores capable of supporting a p number of hardware threads, where p is an integer greater than one.

13. The method of claim 12, wherein the first abstraction indicates that the first PPM provides an n number of logical processing entities, and wherein the second abstraction indicates that the second PPM provides an s number of logical processing entities, where s=m times p.

14. The method of claim 13, wherein the operational information of the first abstraction includes resource sharing information indicating one or more resources shared by the n logical processing entities of the first PPM, and wherein the operational information of the second abstraction includes resource sharing information indicating one or more resources shared by at least some of the s logical processing entities of the second PPM.

15. The method of claim 14, wherein the resource sharing information of the first abstraction indicates that the n logical processing entities of the first PPM share one or more of the following: a processing core, a data pathway, a translation lookaside buffer, and a cache, and wherein the resource sharing information of the second abstraction indicates that at least some of the s logical processing entities of the second PPM share one or more of the following: a processing core, a data pathway, a translation lookaside buffer, and a cache.

16. The method of claim 1, further comprising:
accessing the first abstraction and/or the second abstraction.

17. The method of claim 16, wherein the operational information of the first abstraction includes resource sharing information indicating one or more resources shared by the logical processing entities of the first PPM, and wherein the operational information of the second abstraction includes resource sharing information indicating one or more resources shared by the logical processing entities of the second PPM.

18. The method of claim 17, wherein determining whether to dispatch an execution thread comprises:
determining, based at least partially upon the resource sharing information in the first abstraction and/or the resource sharing information in the second abstraction, whether to dispatch an execution thread to one of the logical processing entities of the first PPM or one of the logical processing entities of the second PPM to be executed thereby.

19. The method of claim 18, wherein the resource sharing information in the first abstraction indicates that the logical processing entities of the first PPM are sharing one or more of the following: a processing core, a data pathway, a translation lookaside buffer, and a cache.

20. The method of claim 19, wherein the resource sharing information in the second abstraction indicates that the logical processing entities of the second PPM are sharing one or more of the following: a processing core, a data pathway, a translation lookaside buffer, and a cache.

21. A computer readable medium carrying instructions for an operating system, wherein the instructions, when executed in a computer system, cause the computer system to perform the operations of:
    receiving a first set of parametric information pertaining to a first physical processing module (PPM), the first PPM having a first architecture;
    constructing a first abstraction of the first PPM based, at least partially, upon the first set of parametric information, the first abstraction comprising an indication of how many logical processing entities are provided by the first PPM, the first abstraction further comprising operational information indicating one or more operational characteristics of the first PPM;
    determining that a second abstraction for a second PPM does not exist, the second PPM having a second architecture, wherein the first architecture is different from the second architecture;
    receiving a second set of parametric information pertaining to the second PPM;
    constructing a second abstraction of the second PPM based, at least partially, upon the second set of parametric information, the second abstraction comprising an indication of how many logical processing entities are provided by the second PPM, the second abstraction further comprising operational information indicating one or more operational characteristics of the second PPM, wherein the second abstraction is different from the first abstraction to reflect at least one difference between the first architecture of the first PPM and the second architecture of the second PPM; and
    dispatching, based on the at least one difference between the first architecture of the first PPM and the second architecture of the second PPM and the operational information in the first abstraction, an execution thread for execution to one of the logical processing entities of the first PPM.

22. The computer readable medium of claim 21, wherein the first PPM comprises a first physical processing core which supports a single hardware thread, wherein the second PPM comprises a second physical processing core which supports a plurality of hardware threads, wherein constructing the first abstraction comprises indicating the first physical processing core as a single logical processing entity, and wherein constructing the second abstraction comprises indicating the second physical processing core as a plurality of logical processing entities.

23. The computer readable medium of claim 21, wherein constructing the second abstraction comprises indicating that the plurality of logical processing entities corresponding to the second physical processing core share one or more resources of the second PPM.

24. The computer readable medium of claim 21, wherein the first PPM has an n number of processing cores, where n is an integer greater than one, each of the n processing cores capable of supporting one hardware thread; and wherein the second PPM has a single processing core capable of supporting an m number of hardware threads, where m is an integer greater than one.

25. The computer readable medium of claim 24, wherein the first abstraction indicates that the first PPM provides an n number of logical processing entities, and wherein the second abstraction indicates that the second PPM provides an m number of logical processing entities.

26. The computer readable medium of claim 25, wherein the operational information of the first abstraction includes resource sharing information indicating one or more resources shared by the n logical processing entities of the first PPM, and wherein the operational information of the second abstraction includes resource sharing information indicating one or more resources shared by the m logical processing entities of the second PPM.

27. The computer readable medium of claim 26, wherein the resource sharing information of the first abstraction indicates that the n logical processing entities of the first PPM share a cache, and wherein the resource sharing information of the second abstraction indicates that the m logical processing entities of the second PPM share one or more of the following: a processing core, a data pathway, a translation lookaside buffer, and a cache.

28. The computer readable medium of claim 21,
    wherein the first PPM has an n number of processing cores, where n is an integer greater than one, each of the n processing cores capable of supporting one hardware thread; and
    wherein the second PPM has an m number of processing cores, wherein m is an integer greater than one, each of the m processing cores capable of supporting a p number of hardware threads, where p is an integer greater than one.

29. The computer readable medium of claim 28, wherein the first abstraction indicates that the first PPM provides an n number of logical processing entities, and wherein the second abstraction indicates that the second PPM provides an s number of logical processing entities, where s=m times p.

30. The computer readable medium of claim 29, wherein the operational information of the first abstraction includes resource sharing information indicating one or more resources shared by the n logical processing entities of the first PPM, and wherein the operational information of the second abstraction includes resource sharing information indicating one or more resources shared by at least some of the s logical processing entities of the second PPM.

31. The computer readable medium of claim 30, wherein the resource sharing information of the first abstraction indicates that the n logical processing entities of the first PPM share a cache, and wherein the resource sharing information of the second abstraction indicates that at least some of the s logical processing entities of the second PPM share one or more of the following: a processing core, a data pathway, a translation lookaside buffer, and a cache.

32. The computer readable medium of claim 21,
    wherein the first PPM has a single processing core capable of supporting an n number of hardware threads, where n is an integer greater than one; and
    wherein the second PPM has an m number of processing cores, wherein m is an integer greater than one, each of the m processing cores capable of supposing a p number of hardware threads, where p is an integer greater than one.

33. The computer readable medium of claim 32, wherein the first abstraction indicates that the first PPM provides an n number of logical processing entities, and wherein the second abstraction indicates that the second PPM provides an s number of logical processing entities, where s=m times p.

34. The computer readable storage medium of claim 33, wherein the operational information of the first abstraction includes resource sharing information indicating one or more resources shared by the n logical processing entities of the first PPM, and wherein the operational information of the second abstraction includes resource sharing information indicating one or more resources shared by at least some of the s logical processing entities of the second PPM.

35. The computer readable medium of claim 34, wherein the resource sharing information of the first abstraction indicates that the n logical processing entities of the first PPM share one or more of the following: a processing core, a data pathway, a translation lookaside buffer, and a cache, and wherein the resource sharing information of the second abstraction indicates that at least some of the s logical processing entities of the second PPM share one or more of the following: a processing core, a data pathway, a translation lookaside buffer, and a cache.

36. The computer readable medium of claim 21, wherein the instructions cause the computer system to further perform the operations of:
  accessing the first abstraction and/or the second abstraction.

37. The computer readable medium of claim 36, wherein the operational information of the first abstraction includes resource sharing information indicating one or more resources shared by the logical processing entities of the first PPM, and wherein the operational information of the second abstraction includes resource sharing information indicating one or more resources shared by the logical processing entities of the second PPM.

38. The computer readable medium of claim 37, wherein determining whether to dispatch an execution thread comprises:
  determining, based at least partially upon the resource sharing information in the first abstraction and/or the resource sharing information in the second abstraction, whether to dispatch an execution thread to one of the logical processing entities of the first PPM or one of the logical processing entities of the second PPM to be executed thereby.

39. The computer readable medium of claim 38, wherein the resource sharing information in the first abstraction indicates that the logical processing entities of the first PPM are sharing one or more of the following: a processing core, a data pathway, a translation lookaside buffer, and a cache.

40. The computer readable medium of claim 39, wherein the resource sharing information in the second abstraction indicates that the logical processing entities of the second PPM are sharing one or more of the following: a processing core, a data pathway, a translation lookaside buffer, and a cache.

41. A computer system comprising:
  a first physical processing module (PPM) having a first architecture;
  an operating system executing within the computer system, wherein the operating system performs the operations of:
    receiving a first set of parametric information pertaining to the first PPM;
    constructing a first abstraction of the first PPM based, at least partially, upon the first set of parametric information, the first abstraction comprising an indication of how many logical processing entities are provided by the first PPM, the first abstraction further comprising operational information indicating one or more operational characteristics of the first PPM;
    determining that a second abstraction for a second PPM does not exist, the second PPM having a second architecture wherein the first architecture is different from the second architecture;
    receiving a second set of parametric information pertaining to the second PPM;
    constructing a second abstraction of the second PPM based, at least partially, upon the second set of parametric information, the second abstraction comprising an indication of how many logical processing entities are provided by the second PPM, the second abstraction further comprising operational information indicating one or more operational characteristics of the second PPM, wherein the second abstraction is different from the first abstraction to reflect the differences between the first architecture of the first PPM and the second architecture of the second PPM; and
    dispatching, based on the at least one difference between the first architecture of the first PPM and the second architecture of the second PPM and the operational information in the first abstraction, an execution thread for execution to one of the logical processing entities of the first PPM.

42. The computer system of claim 41, wherein the first PPM comprises a first physical processing core which supports a single hardware thread, wherein the second PPM comprises a second physical processing core which supports a plurality of hardware threads, wherein constructing the first abstraction comprises indicating the first physical processing core as a single logical processing entity, and wherein constructing the second abstraction comprises indicating the second physical processing core as a plurality of logical processing entities.

43. The computer system of claim 42, wherein constructing the second abstraction comprises indicating that the plurality of logical processing entities corresponding to the second physical processing core share one or more resources of the second PPM.

44. The computer system of claim 41,
  wherein the first PPM has an n number of processing cores, where n is an integer greater than one, each of the n processing cores capable of supporting one hardware thread; and
  wherein the second PPM has a single processing core capable of supporting an m number of hardware threads, where m is an integer greater than one.

45. The computer system of claim 44, wherein the first abstraction indicates that the first PPM provides an n number of logical processing entities, and wherein the second abstraction indicates that the second PPM provides an m number of logical processing entities.

46. The computer system of claim 45, wherein the operational information of the first abstraction includes resource sharing information indicating one or more resources shared by the n logical processing entities of the first PPM, and wherein the operational information of the second abstraction includes resource sharing information indicating one or more resources shared by the m logical processing entities of the second PPM.

47. The computer system of claim 46, wherein the resource sharing information of the first abstraction indicates that the n logical processing entities of the first PPM share a cache, and wherein the resource sharing information of the second abstraction indicates that the m logical processing entities of the second PPM share one or more of the following: a processing core, a data pathway, a translation lookaside buffer, and a cache.

48. The computer system of claim 41,
wherein the first PPM has an n number of processing cores, where n is an integer greater than one, each of the n processing cores capable of supporting one hardware thread; and
wherein the second PPM has an m number of processing cores, wherein m is an integer greater than one, each of the m processing cores capable of supporting a p number of hardware threads, where p is an integer greater than one.

49. The computer system of claim 48, wherein the first abstraction indicates that the first PPM provides an n number of logical processing entities, and wherein the second abstraction indicates that the second PPM provides an s number of logical processing entities, where s=m times p.

50. The computer system of claim 49, wherein the operational information of the first abstraction includes resource sharing information indicating one or more resources shared by the n logical processing entities of the first PPM, and wherein the operational information of the second abstraction includes resource sharing information indicating one or more resources shared by at least some of the s logical processing entities of the second PPM.

51. The computer system of claim 50, wherein the resource sharing information of the first abstraction indicates that the n logical processing entities of the first PPM share a cache, and wherein the resource sharing information of the second abstraction indicates that at least some of the s logical processing entities of the second PPM share one or more of the following: a processing core, a data pathway, a translation lookaside buffer, and a cache.

52. The computer system of claim 41,
wherein the first PPM has a single processing core capable of supporting an n number of hardware threads, where n is an integer greater than one; and
wherein the second PPM has an m number of processing cores, wherein m is an integer greater than one, each of the m processing cores capable of supporting a p number of hardware threads, where p is an integer greater than one.

53. The computer system of claim 52, wherein the first abstraction indicates that the first PPM provides an n number of logical processing entities, and wherein the second abstraction indicates that the second PPM provides an s number of logical processing entities, where s=m times p.

54. The computer system of claim 53, wherein the operational information of the first abstraction includes resource sharing information indicating one or more resources shared by the n logical processing entities of the first PPM, and wherein the operational information of the second abstraction includes resource sharing information indicating one or more resources shared by at least some of the s logical processing entities of the second PPM.

55. The computer system of claim 54, wherein the resource sharing information of the first abstraction indicates that the n logical processing entities of the first PPM share one or more of the following: a processing core, a data pathway, a translation lookaside buffer, and a cache, and wherein the resource sharing information of the second abstraction indicates that at least some of the s logical processing entities of the second PPM share one or more of the following: a processing core, a data pathway, a translation lookaside buffer, and a cache.

56. The computer system of claim 41, wherein the operating system further performs the operations of:
accessing the first abstraction and/or the second abstraction.

57. The computer system of claim 56, wherein the operational information of the first abstraction includes resource sharing information indicating one or more resources shared by the logical processing entities of the first PPM, and wherein the operational information of the second abstraction includes resource sharing information indicating one or more resources shared by the logical processing entities of the second PPM.

58. The computer system of claim 57, wherein determining whether to dispatch an execution thread comprises:
determining, based at least partially upon the resource sharing information in the first abstraction and/or the resource sharing information in the second abstraction, whether to dispatch an execution thread to one of the logical processing entities of the first PPM or one of the logical processing entities of the second PPM to be executed thereby.

59. The computer system of claim 58, wherein the resource sharing information in the first abstraction indicates that the logical processing entities of the first PPM are sharing one or more of the following: a processing core, a data pathway, a translation lookaside buffer, and a cache.

60. The computer system of claim 59, wherein the resource sharing information in the second abstraction indicates that the logical processing entities of the second PPM are sharing one or more of the following: a processing core, a data pathway, a translation lookaside buffer, and a cache.

* * * * *

UNITED STATES PATENT AND TRADEMARK OFFICE
CERTIFICATE OF CORRECTION

| | | |
|---|---|---|
| PATENT NO. | : 7,614,056 B1 | Page 1 of 1 |
| APPLICATION NO. | : 10/661413 | |
| DATED | : November 3, 2009 | |
| INVENTOR(S) | : Eric C. Saxe et al. | |

It is certified that error appears in the above-identified patent and that said Letters Patent is hereby corrected as shown below:

In Claim 23, Column 17 (line 61), please replace "claim 21" with --claim 22--;

In Claim 32, Column 18 (line 65), please replace "supposing" with --supporting--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO.        : 7,614,056 B1                                            Page 1 of 1
APPLICATION NO. : 10/661413
DATED             : November 3, 2009
INVENTOR(S)       : Saxe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1649 days.

Signed and Sealed this

Nineteenth Day of October, 2010

David J. Kappos
*Director of the United States Patent and Trademark Office*